Nov. 17, 1959 R. G. LE TOURNEAU 2,913,223
ELECTRICALLY POWERED LOGGING ARCH
Filed Aug. 24, 1955 3 Sheets-Sheet 1

INVENTOR.
Robert G. LeTourneau
BY
Wm. T. Wofford
Attorney

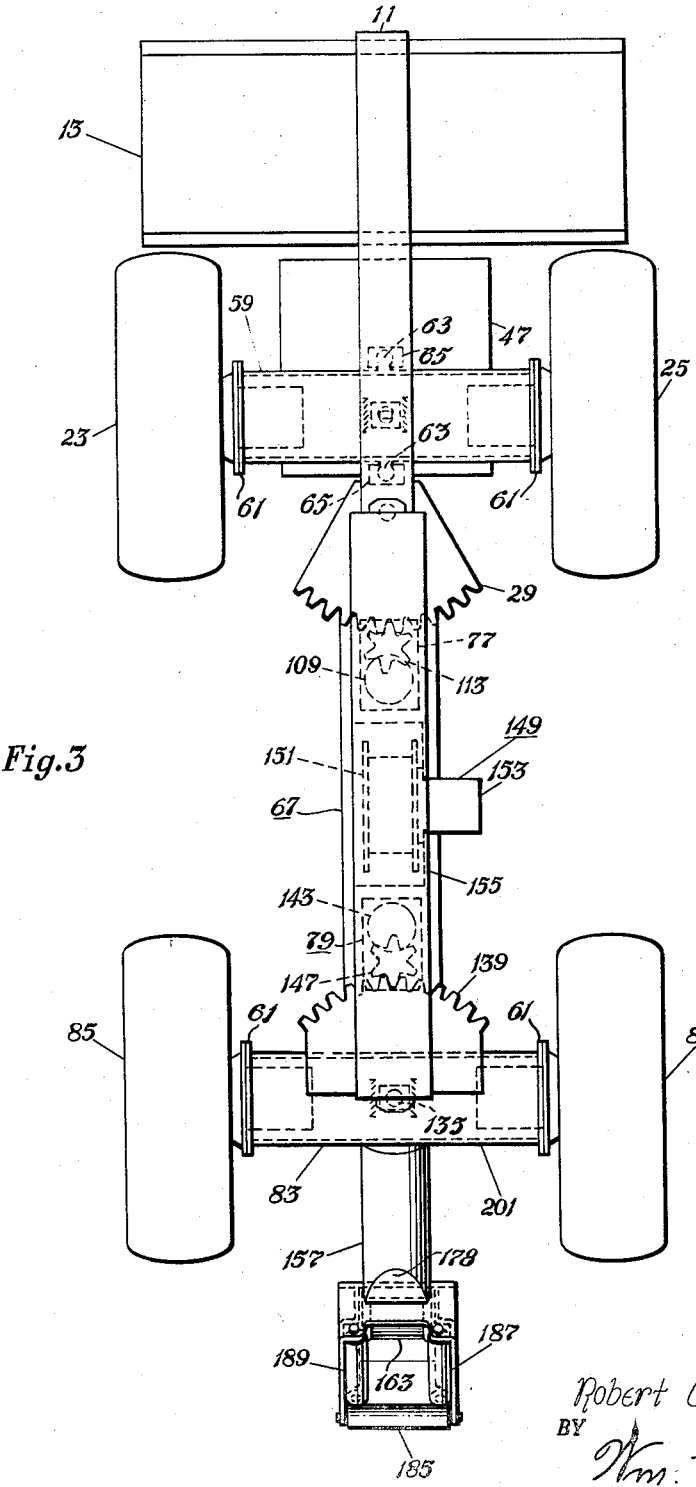

United States Patent Office 2,913,223
Patented Nov. 17, 1959

2,913,223

ELECTRICALLY POWERED LOGGING ARCH

Robert G. LeTourneau, Longview, Tex.

Application August 24, 1955, Serial No. 530,251

3 Claims. (Cl. 254—139.1)

My invention relates to heavy duty electrically powered self-propelled vehicles, and more particularly to heavy duty logging arch construction and electric drive means therefor.

A major problem in modern logging is that of getting the logs from the stumps to existing transportation arteries with reasonable economy. Crawler type tractors have been used effectively to transport logs from the stumps to bunching points where they are loaded on trucks. However, the economical operating range of crawlers is limited to a very few hundred yards per trip. This means that it has been necessary to construct extensive secondary truck haul roads, which cost at least several thousand dollars per mile. Great savings could be effected by elimination of the necessity for construction of secondary haul roads of the quality required for negotiation by trucks. This points to the need for a powerful rugged logging arch capable of handling large loads over rough terrain and on adverse grades, with an economical operating range of several times that of the crawler type tractor. Such a machine would haul logs from bunch points to primary haul roads, utilizing inexpensive dozed trails, and thus eliminating the need for expensive secondary truck haul roads. Requisites for the desired machine would include rubber tired wheels for speed and range; practical effective tractive power on the arch wheels where the bulk of the load weight is concentrated; a high degree of readily controlled maneuverability; simple but rugged construction affording the operator a high degree of unobstructed visibility of the arch per se, and particularly of the load and hook-on means; maximum protection for all working parts, especially the steering mechanism and the wheel drive means; and size, strength and power for large load capacity.

It is accordingly an object of my invention to provide a machine that will fill the need aforementioned, insofar as possible.

Another object of my invention is to provide a logging arch wherein tractive power is practically and effectively applied to the rear wheels where the bulk of the load weight is concentrated.

Another object of my invention is to provide a logging arch which shall be economically and practically capable of making relatively long hauls with heavy loads over rough terrain including adverse grades.

Another object of my invention is to provide a logging arch which shall be large and powerful and yet have a high degree of readily controllable maneuverability.

Another object of my invention is to provide a logging arch of simple but rugged construction, affording the operator a high degree of unobstructed visibility of the arch per se, and particularly of the load and the hook-on means.

Another object of my invention is to provide a logging arch of construction affording maximum protection for all working parts, and especially for the steering mechanism and the wheel drive means.

These and other objects are effected by my invention as will be apparent from the following description taken in accordance with the accompanying drawings, forming a part of this application, in which:

Fig. 3 is a schematic bottom view of the logging arch of my invention.

Figure 1:
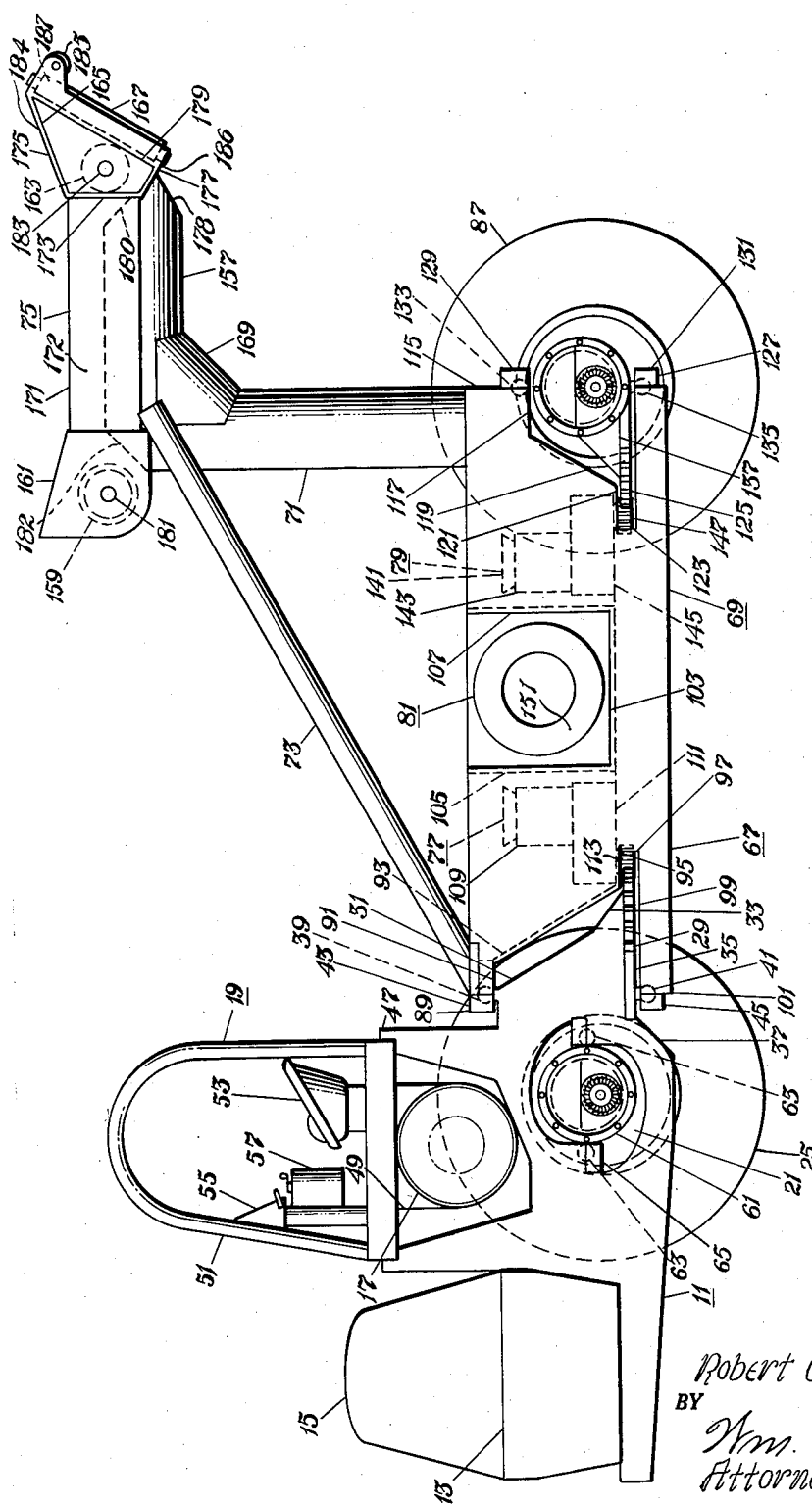
Fig. 1 is a schematic side elevational view of the logging arch of my invention, with the near wheels and the towing cable removed.

Referring now to the drawings, the logging arch front end assembly 11 comprises a body or main frame, a power plant cradle support 13, a power plant 15, fuel tank 17, operators cab 19, front axle mount 21, front wheels 23, 25, front wheel drive assemblies 27, steering sector gear 29, and front end-to-rear end coupling device.

The front end body 11 is made up of welded steel plate elements to form a relatively long and narrow irregular shaped figure. The body may be considered as an irregular shaped hollow beam having a front portion of relatively small vertical extent with a top surface substantially horizontal to receive the power plant cradle 13, a middle portion of relatively large vertical extent sufficient to allow for a centrally disposed opening carrying axle mounts, and a rear portion having a first surface 31 extending downwardly at an acute angle with the vertical, a second surface 33 extending downwardly from the first but at a less acute angle, a third and substantially horizontal surface 35 extending forwardly from the second surface, and a fourth surface 37 extending forwardly and downwardly from said third surface. Mounted on the top surface of the body and adjacent the rear end and centrally disposed with respect to the transverse dimension of said body is an upstanding ball 39. A depending ball 41 is mounted to said third surface adjacent its front end and vertically aligned with said upstanding ball. Said balls cooperate with sockets 43, 45 on the rear end assembly to form the front end-to-rear end coupling device. The front end steering sector gear 29 is mounted to said third surface 35 and extends rearwardly therefrom, being centrally disposed with respect to the transverse dimension of said body.

The power plant cradle 13 is simply a relatively shallow open-topped steel box. The cradle extends transverse of the front beam portion of said body and is welded thereto. The power plant 15 comprises an internal combustion engine driving electric generators.

The operator's cab 19 comprises a platform 47 carried by a pair of vertical pedestals 49 which are fixed to the top surface of the body middle portion. The cab canopy 51, comprising an inverted U-shaped frame, is fixed to the platform 47. The canopy 51 is covered with heavy wire mesh (not shown) for operator protection. The platform 47 also carries the operators seat 53, control panel 55, and motor controller 57. A fuel tank 17 is suspended from the cab platform and extends between the platform pedestals.

The front axle 59 has a main body portion in the shape of a steel tube made from heavy steel plate material. The main body has bolt flanges 61 welded to its ends. Aligned mounting balls 63 are fixed on opposite sides of said body at its longitudinal center. In the case of the front axle the balls 63 are horizontally disposed to cooperate with sockets 65 carried by the central opening of the front end body, to give "rocking axle" action. Further details of the axle, wheels, and wheel drivers will be hereinafter described.

The logging arch rear end assembly 67 comprises a body or main frame portion 69, the arch main support column 71, the arch forward brace members 73, the arch head 75, front and rear steering drive assemblies 77, 79, cable drum assembly 81, rear axle 83, rear wheels 85, 87 and wheel drive assemblies 27.

The rear end body or main frame 69 may be generally described as a relatively long and narrow box of irregular shape and made up of welded heavy steel plate members. The forward face of the body beginning at the top comprises a short downwardly extending first vertical surface 89, a second horizontal surface 91 extending rearwardly from said first surface, a third surface 93 extending downwardly and rearwardly from said second surface, a fourth surface 95 extending rearwardly and horizontally from said third surface, a fifth surface 97 extending vertically downward from said fourth surface, a sixth surface 99 extending forwardly and horizontally from said fifth surface, and a seventh surface 101 extending vertically downward from said sixth surface. Said first and seventh surfaces 89, 101 carry sockets 43, 45 which cooperate with vertically aligned balls 39, 41 on the front end assembly 11 to make up the front end-to-rear end coupling device. The rear end body has a horizontally extending partition 103 having a portion of its lower face forming said fourth surface 95. Said rear end body also has a pair of vertical partitions 105, 107 extending upwardly from said horizontal partition 103 and dividing said body 69 into three approximately equal compartments. The forward compartment of said body houses the front steering drive means 77. The front steering drive means comprises an electric motor 109 and a gear box 111 having an output pinion 113. The gear box 111 is fixed to the body horizontal partition 103 with the pinion 113 extending through an opening in said fourth surface 95 to engage the front steering sector gear 29.

Said rear end body 69 has a rear face, comprising a first cylindrical surface 115 extending downwardly from the top, a second horizontal surface 117 extending forwardly from said first surface, a third surface 119 extending downwardly and forwardly from said second surface, a fourth horizontal surface 121 extending forwardly from said third surface, a fifth vertical surface 123 extending downwardly from said fourth surface, a sixth substantially horizontal surface 125 extending forwardly from said fifth surface, and a seventh vertical surface 127 extending downwardly from said sixth surface, said first and seventh surfaces 115, 127 mount vertically aligned sockets 129, 131 which cooperate with balls 133, 135 on the rear axle 83.

The logging arch rear axle 83 is substantially identical with the front axle 51 except that the rear axle has its mounting balls vertically aligned and has a forwardly extending built up portion 137 carrying the rear steering sector gear 139. The rear steering drive assembly 141 comprises a motor 143 and a gear box 145 having an output pinion 147. The rear steering drive assembly is housed in the rear compartment of the body 67 and is fixed to the body horizontal partition 103 with the pinion 147 extending through an opening in the fourth body rear face surface 121 to engage the rear steering sector gear 139.

The cable drum assembly 149 comprises the cable drum 151, and the drum drive motor and gear box 153. The gear box 153 is fixed to the surface of one side wall 155 of the rear body central compartment with the gear box output shaft extending through an opening in the side wall. The cable drum 151 is mounted on the gear box output shaft and so is housed by the rear body center compartment.

Fixed to the upper rear portion of the rear body 67 and upstanding therefrom, is the arch main support column 71 in the form of a heavy cylindrical tube. The arch forward braces 73 are spaced parallel tubular members fixed at their lower ends to the top forward portion of said rear body and extending rearwardly and upwardly therefrom and having their upper ends fixed to opposite sides of said main support column 71. The logging arch head 75 comprises a horizontal tubular member 157, a cable tunnel 172, a front cable guide spool 159, front spool support means 161, a rear cable guide spool 163, rear spool support means 165, and a fairlead assembly 167. The horizontal tubular member 157 has the same diameter as the main support column 71 and extends rearwardly thereof and perpendicular thereto. The upper end of the main support column is formed so as to fit the outer surface of the lower front end of the horizontal tubular member 157, and is fixed thereto by welding. A bracing member 169 which is a segment of tubular material having the same diameter as the main support column and formed to fit the outer surfaces of the main support column and horizontal tubular member, is fixed thereto by welding at the right angle formed by said column and horizontal tubular member. The rear end of the horizontal tubular member is tapered from top and bottom with the tapered portion being closed by flat plates 178, 180, which are welded to said member. The top front end of the horizontal tubular member is tapered with the tapered portion being covered by a flat plate 182 which is welded to said member. A canopy 171 in the form of an inverted open end rectangular trough is welded to the sides of the horizontal tubular member 157. The trough, together with the horizontal tubular member form the cable tunnel. The rear cable guide spool 163 and the fairlead assembly 167 are supported by a housing which is made up of a pair of spaced parallel trapezoidal plates which are welded to the rear end portion of the trough sides. A first side 173 of the plates is vertical and coextensive with the corresponding trough side, a second side 175 extends rearwardly and upwardly from the top of the first side, a third side 177 extends rearwardly and downwardly from the bottom of the first side, and a fourth side 179 extends rearwardly and upwardly from the third side. Welded plates 184, 186 close the top and bottom openings formed by the trapezoidal plates. The front cable guide spool support 161 is an inverted trough-shaped section welded to the sides and top of the rectangular trough 171 near its rear end and extending forwardly from said rectangular trough with its top portion tapered slightly upward. The front and rear cable guide spools are mounted for rotation on respective horizontal shafts 181, 183 which are carried respectively by the front spool and rear spool support means. The shafts are so centered that cable passing over the spools will be approximately vertically centered in the tunnel. The side of the fairlead assembly housing which faces rearwardly and downwardly is open. The fairlead assembly comprises a top and two side cable guide rollers. The top roller 185 is horizontally disposed just inside and parallel to the upper edge of the housing open side. The two side cable guide rollers 187, 189 are disposed just inside and parallel to the respective side edges of the housing open side, with the upper ends of the side rollers disposed just forward of the top roller.

As hereinbefore mentioned, the logging arch axles are heavy steel tubular members having a bolt flange 61 fixed to each end. Oppositely disposed balls 63, 135 are fixed to the outer surface of the axle at its longitudinal center. These balls cooperate with mounting sockets on the arch body. In the case of the front axle, the balls 63 are horizontally aligned when mounted in the sockets 65. This is because the front axle is a "rocking axle." In the case of the rear axle, the balls 133, 135 are vertically aligned when mounted, since the rear axle is a "steered" axle. Further, the rear axle has a built up portion 137 on its lower rear side to which a steering sector gear is fixed.

Figure 2:
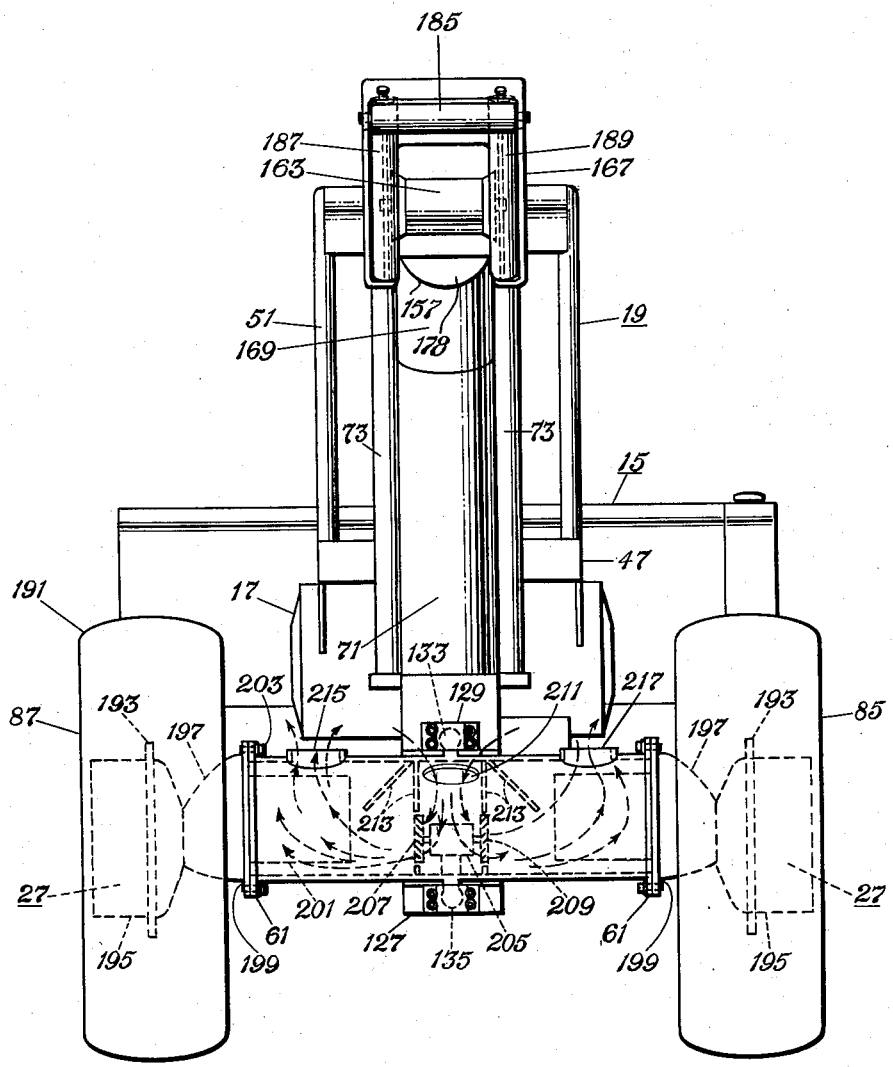
Fig. 2 is a schematic rear end elevational view of the logging arch of my invention.

A wheel and wheel drive assembly is bolted to each end of each axle. With reference to Figure 2, a wheel drive assembly 27 comprises a rubber tire 191 mounted on a rim (not shown) which is in turn bolted to a bolt flange 193 carried by a drum-shaped gear box 195. The drum-shaped gear box is fixed to the small end of the housing of a second gear box 197 which has the general shape of an eccentric hemisphere. The second gear box 197 carries a bolt flange 199 at its large end, which flange matches the bolt flange on the end of the axle. The second gear box 197 has also a bolt ring (not shown) at its large end disposed inwardly from the flange 199. An electric drive motor 201 is bolted to this bolt ring. Thus, the wheel and wheel driver assembly is unitary and may be very easily mounted to the axle or removed from it, since the matching bolt flanges and bolts 203 constitute the whole of the mounting means. For details of an electric wheel drive of this general type, reference is made to my copending application, Serial No. 181,038, filed August 23, 1950, entitled Electric Wheel, and since issued as Patent No. 2,726,786.

When the driver assembly is mounted, the electric drive motor, of course, extends into the axle, and must be cooled. For this purpose a blower 205 carrying a fan 207, 209 at each end is mounted in the axle at the bottom side midway between the ends. The fan blades are disposed to blow air in opposite directions away from the fan motor. An air intake port 211 is located on the axle surface above the blower motor. Baffles 213 mounted inside the axle direct the air from the intake port 211 to the blower, and from the blower to each electric drive motor and over the motor and out exhaust ports 215, 217 in the axle surface near the ends. In addition to the air intake and exhaust ports, various inspection plates (not shown) may be provided as needed on the axle surface.

In operation, the entire machine may be conveniently and easily controlled from the operators cab. Application of power from the generators to the motors is accomplished by means of magnetic contactors (not shown) actuated by solenoids controlled from the operator's control panel.

It is apparent that the clean simple lines on the logging arch herein described afford the operator a high degree of unobstructed visability of the arch per se, and particularly of the load and the log hook-on means. This is important both for proper load handling, and for the safety of the hook-on operator. It is further apparent that the logging arch construction herein described provides maximum protection for all working parts. The steering drive motors are completely housed in their compartments, and the cable drum assembly is well protected. The wheel drive motors are totally enclosed within the axles. The tubular type axles not only afford complete protection for the drive motors but lend themselves to simple construction techniques, and also make possible easy mounting and removal of the unitary wheel drive assemblies.

While I have shown my invention in only one form, it will be apparent to those skilled in the art that it is not so limited, but is susceptible of various modifications without departing from the spirit thereof.

I claim:

1. A logging arch comprising a front body portion, a rocking axle pivotally mounted to said front body portion and a pair of wheels thereon for supporting said front body portion, electric power means adjacent said wheels for driving said wheels, a rear body portion, means coupling said front and rear body portions in articular relation for steering movement, power means on said rear body portion for turning said front body portion to steer the arch, an axle and a pair of wheels supporting said rear body portion, electric power means on said rear body portion for driving said last mentioned wheels, power generating means mounted on said front body portion and connected to said wheel driving means and said power steering means, a fairlead assembly mounted on said rear body portion at the rear thereof and above said rear axle, and power operated cable reeving means on said rear body portion forwardly of said fairlead assembly.

2. A logging arch comprising in combination a frame, a front axle connected to said frame having a wheel mounted at each end, said front axle being pivotally mounted for steering movement to steer the arch, a rear axle having a wheel mounted at each end, said rear axle being pivotally connected to the rear portion of said frame for steering movement, power means for pivotally moving said axles to steer the arch, means including an electric drive motor for each wheel for propelling the arch, a main supporting column extending upwardly from the rear of said frame over said rear axle midway between the rear wheels, a cable guide support on the upper end of said column extending rearwardly beyond the end of said frame, cable guide pulleys mounted on the front and rear ends of said cable guide support, bracing means connected to the upper end of said supporting column extending forwardly and downwardly to said frame adjacent the forward end, a cable drum and electric drive motor therefor mounted on said frame forwardly of said supporting column, and an electric power generating plant supported by said frame adjacent said front axle for supplying electric power for all of said drive motors.

3. A logging arch comprising a front body portion having an axle and a pair of wheels thereon for supporting said body portion, a rear body portion coupled to said front body portion for pivoting movement about a vertical axis, a rear axle pivotally connected to said rear body portion for steering movement about a vertical axis, a pair of wheels mounted on said rear axle, said rear body portion having a box beam construction providing front, intermediate and rear compartments, a single upstanding main supporting column extending upwardly from said rear body portion adjacent the rear axle, cable guides and support means therefor secured to the top of said column and extending rearwardly therefrom, brace means extending from the upper portion of said column downwardly and forwardly to the front of said rear body portion, power driven steering means for moving said front body portion to steer the arch including an electric steering drive motor in said front compartment, power driven steering means for said rear axle including an electric steering drive motor in said rear compartment, a cable drum and electric motor drive therefor in said central compartment adapted to operate over said cable guides, electric drive motors for said wheels, and an electric power generating plant mounted on said front body portion forward of said front wheels for supplying electric power for all of said electric motors.

References Cited in the file of this patent

UNITED STATES PATENTS

| | | |
|---|---|---|
| 1,427,362 | Cozzens | Aug. 29, 1922 |
| 2,235,215 | Kelly | Mar. 18, 1941 |
| 2,504,954 | Allin | Apr. 25, 1950 |
| 2,518,322 | Hovey-King et al. | Aug. 8, 1950 |
| 2,598,863 | Tucker | June 3, 1952 |
| 2,627,983 | Lathers | Feb. 10, 1953 |
| 2,797,829 | Hart | July 2, 1957 |